Aug. 10, 1965    TOKIO NAKAMURA ETAL    3,199,408
RACK CUTTER
Filed July 9, 1963    2 Sheets-Sheet 1

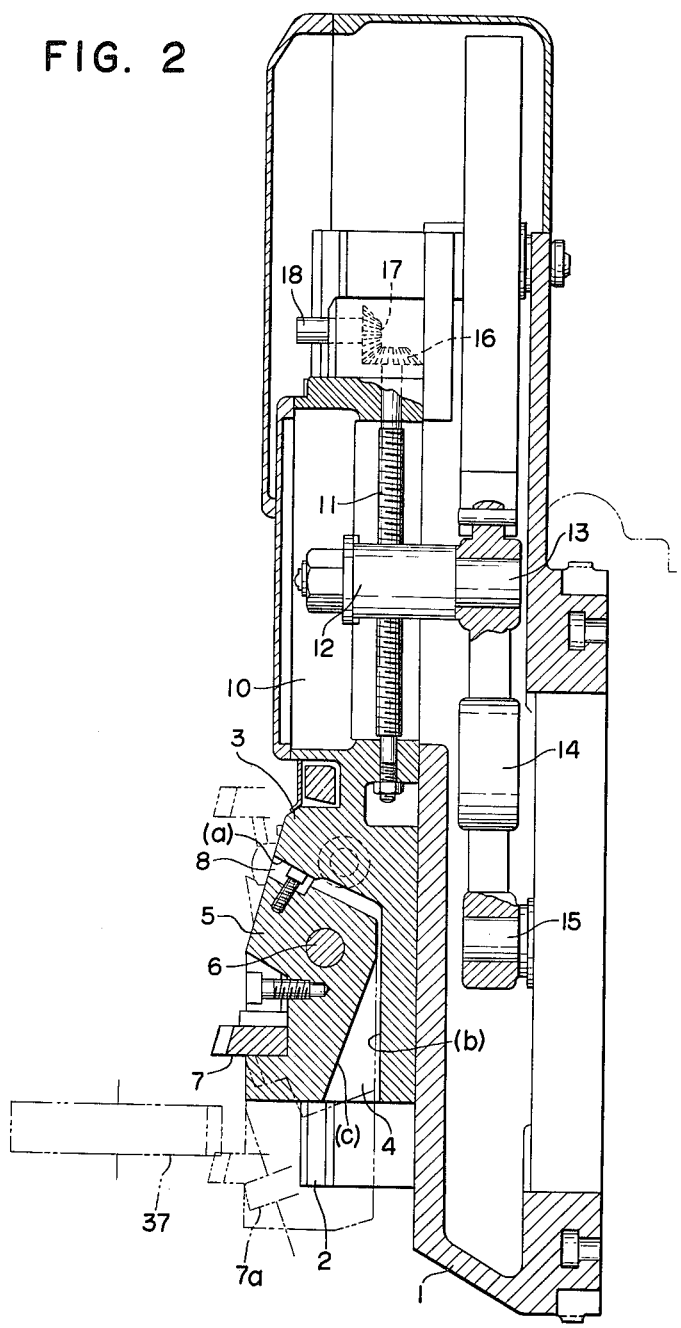

United States Patent Office 3,199,408
Patented Aug. 10, 1965

3,199,408
RACK CUTTER
Tokio Nakamura, Mizuho-ku, Nagoya-shi, Masaharu Araki, Nakamura-ku, Nagoya-shi, and Hirohiko Kuroi, Inaba-gun, Gifu-ken, Japan, assignors to Howa Sangyo Kabushiki Kaisha, Nagoya-shi, Japan, a joint-stock company of Japan
Filed July 9, 1963, Ser. No. 293,739
Claims priority, application Japan, July 11, 1962, 37/28,512
6 Claims. (Cl. 90—8)

The present invention relates to an improved rack cutter.

When tooth cutting is to be carried out by a rack cutter, the cutter is made to carry out a reciprocating motion in vertical direction with the edge of a disk-shaped raw material being placed in front of the cutter for cutting teeth. As soon as the cutting of teeth on the material has been completed, it becomes necessary to change the relative position in a horizontal direction between the cutter and the material in order to have a new tooth cut.

Since the cutter is in a vertical reciprocating motion, the said changing operation could only be accomplished in the conventional mechanism by stopping the vertical motion for a while, or by moving the whole support of the cutter backward or moving the tool rest backward, which made the mechanism of the equipment complicated and resulted in a waste of cutting time, rendering the operation inefficient.

Therefore, an essential object of the present invention is to provide an improved rack cutter capable of performing the above-mentioned changing operation without stopping the vertical motion of the cutter, nor moving the whole support of the cutter or the cutting mechanism.

Said object and other objects of the present invention have been attained by inserting a cutter box into a slide which reciprocates vertically with respect to the main body so as to permit rotation of the cutter box and attaching a cutter to the said cutter box which in turn is coupled with a driving mechanism so that the rack cutter is made to operate at a position in which it is in contact with or at another position in which it is not in contact wth the raw material by means of rotation of the cutter box.

The nature of the invention, its details, and the manner in which the above-stated objects, as well as other objects and advantages which will presently become apparent, may best be achieved will be more clearly apparent by reference to the following description when taken in connection with the accompanying drawings in which like parts are designated by like reference numerals and letters, and in which:

FIG. 2 is a sectional view along a line II—II of FIG. 1;

Figure 3:
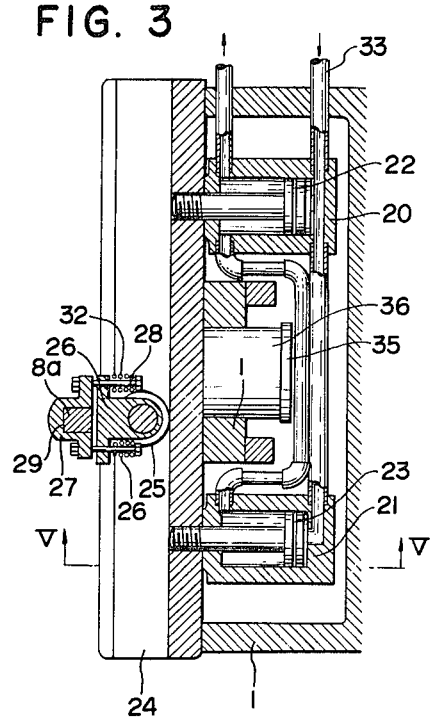
FIG. 3 is an enlarged sectional view along a line III—III of FIG. 1.
Figure 1:
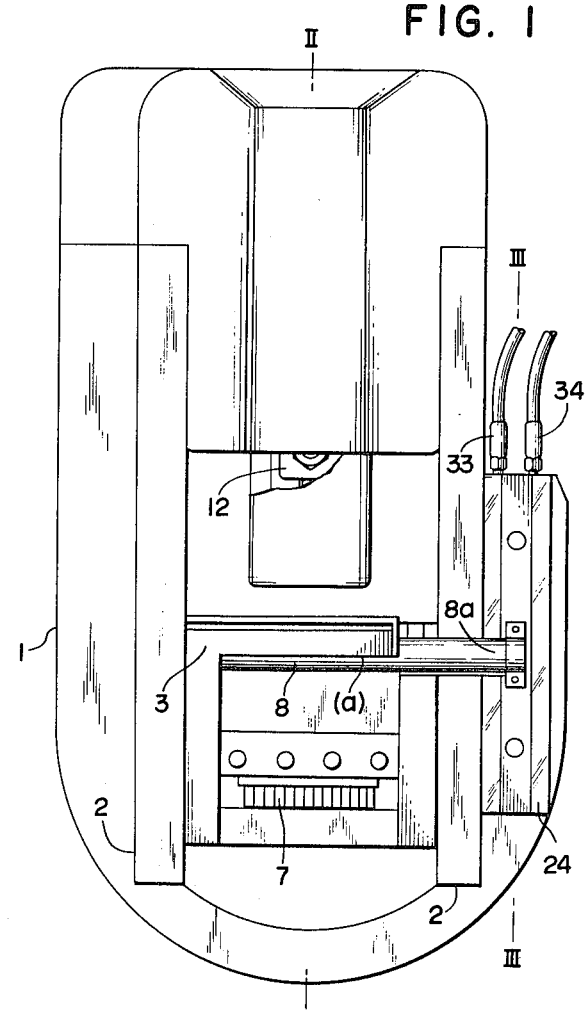
FIG. 1 is front view for showing an example of the present invention.

In the embodiment as shown in drawing, a pair of guide rails 2 and 2 is provided on the body 1 in a longitudinal direction, a slide 3 is fitted between the said rails 2 and 2 so that it can move with a vertical motion, a cutter box 5 is pivoted in a cavity 4 of the said slide 3 so as to be rotated forward and backward by means of a horizontal shaft 6. To the lower front of the cutter box 5 is attached a rack cutter 7 horizontally, and to the top of the box 5 is attached a lever 8 the top of which is made to abut against the top surface (a) of the cavity 4. In a long hole 10 drilled into the top of the slide 3 is engaged a male screw rod 11 in longitudinal direction, and a nut 12 screwed in said male screw rod is provided with a pin 13, the said pin 13 being connected to a crank pin 15 by means of an arm 14. The top of the male screw rod is connected to a square shaft 18 through bevel gears 16 and 17.

A pair of cylinders 20 and 21 is provided at the top and bottom portions on the side of the body 1. Pistons 22 and 23 are fitted in the said cylinders so as to be moved forward and backward in the said cylinders, each of said pistons 22 and 23 having at the front end thereof a rail 24 with a cross-section shaped like a rectangle with one side removed. Into the said rail 24 is inserted a roller 25 supported by a frame 26, and a holder 27 having a cross section shaped like Ω is loosely supported in said frame 26 by means of pins 28 and 28. The lateral extension 8a of the lever 8 is inserted into a cavity 29 of the holder 27. At both ends of the pins 28, 28 are provided flanges 30 and 31 and springs 32, 32 are inserted between the said flanges 30, 30 and the supporting frame 26.

The apparatus shown in the drawings comprises tubes 33 and 34 to introduce a pressure liquid into the cylinders 20 and 21, an abutment 35 on a rod 36 which in turn is attached to the backside of the rail 24, and a raw material 37 to be cut.

Now, the function of the said embodiment will be explained.

When a driving motor (not illustrated) is started, the crank-pin 15 is revolved, thus causing the slide 3 to make vertical reciprocating motion through the arm 14, pin 13, nut 12, and male screw rod 11. While the raw material is being cut, the pistons 22 and 23 are at the back position as shown by full lines in FIG. 3, the upper surface of the lever 8 is in contact with the top of the cavity 4 of the slide 3, and the rack cutter 7 is set in a working position in which it is in engagement with the raw material.

Figure 4:
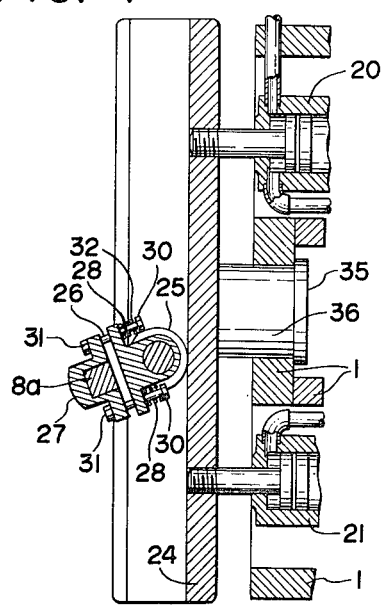
FIG. 4 is the same view as FIG. 3 with a piston being shown in its operating position.
Figure 5:
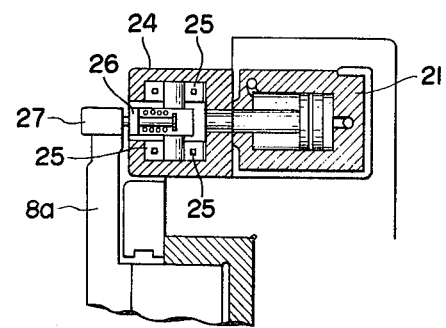
FIG. 5 is a cross sectional view along a line V—V of FIG. 3.

Thus, when operation is to be changed for cutting a new tooth upon the completion of a tooth on the raw-material, a pressure liquid is introduced into the back of the cylinders 20 and 21 by means of the tube 33, thus causing the pistons 22 and 23 and the rail 24 to move forward until the abutment 35 touches the body 1 as shown in FIG. 4, whereby the lever 8 is pushed forward and the cutter box 5 is made to rotate counterclockwise around the axis 6 as illustrated in broken lines in FIG. 2.

When the cutter box 5 is rotated as described above, the rear side surface (c) of the cutter box 5 is brought in contact with the back surface (b) of the cavity 4 and the rack cutter 7 moves backward until it takes a position 7a where it doesn't interfere with the raw material 37 as shown by a dotted line.

Therefore, it becomes possible to work the raw material in lateral direction while the slide 3 is making a vertical motion.

When the new portion of the raw material 37 moves to the front side of the cutter 7, a pressure liquid is introduced into the front part of the cylinders 20 and 21 through the tube 34, whereby all parts are set into motions in the opposite direction, thus bringing the cutter 7 into contact with the raw material 37 and making is possible to start a new cutting operation.

The above cutter box mechanism is only an example and can be of different type.

As explained heretofore, according to the present invention, since to a slide which reciprocates in a vertical direction with respect to the main body is attached to a cutter box to permit said cutter box to rotate and this cutter box is provided with a cutter and is connected with a driving mechanism so that by the rotation of the cutter box its rack-cutter can be brought to a position in contact or a position not contact with the raw material, it becomes possible to change the cutting operation in the state of the slide being in an operating position, thus resulting in more convenience in operation, less power loss, and faster changing in operation, whereby the working time is economized and the working becomes more effective in practice.

Although this invention has been described with respect to a particular embodiment thereof, it is not to be so limited as changes and modifications may be made therein which are within the full intended scope of the invention, as defined by the appended claims.

What is claimed is:

1. A rack cutter comprising a vertically reciprocable slide, means for reciprocating said slide, said slide having a cavity, a cutter box pivotally mounted in said cavity to rotate about a horizontal axis, a cutter carried by said cutter box, an arm on said cutter box projecting approximately parallel to said axis, a vertical actuating bar engageable with said arm to turn said cutter box about said axis from a working position in which said cutter engages a work piece to a retracted position in which said cutter does not engage the work piece, and means for moving said actuating bar horizontally while keeping it vertical to turn said cutter box about its axis from said working position to said retracted position.

2. A rack cutter according to claim 1, in which said means for moving said actuating bar comprises two parallel horizontal hydraulic cylinders, a piston operable in each cylinder and means connecting said pistons to vertically spaced portions of said bar.

3. A rack cutter according to claim 2, in which a rod parallel to said pistons is fixed to said bar between said pistons and is slidable in a stationary guide member and in which abutment means on said rod is engageable with said guide member to limit the movement of said bar in a direction away from said guide member.

4. A rack cutter according to claim 1, in which said cutter is below said axis and said arm is above said axis.

5. A rack cutter according to claim 1, in which said actuating bar is formed with a longitudinal recess and in which said bar has a roller running in said recess and engageable by opposite sides of said recess to move said arm in opposite directions.

6. A rack cutter comprising a vertically reciprocable slide having an elongated vertical hole in its upper portion and a cavity in its lower portion, means guiding said slide for vertically reciprocating movement, a screw rod rotatable mounted in said vertical hole and extending longitudinally thereof, a nut on said screw rod and having a laterally directed pin, crank means connected with said pin for vertically reciprocating said nut and said slide, means for rotating said screw rod to move said nut vertically thereon and thereby vary the stroke of said slide, a cutter box pivotally mounted in said cavity of said slide to turn about a horizontal axis, a cutter carried by a lower portion of said cutter box, an arm on the upper portion of said cutter box, said arm projecting approximately parallel to said axis, a vertical actuating bar engageable with said arm, a pair of horizontal hydraulic pistons connected with said bar at vertically spaced points, said pistons being operable respectively in hydraulic cylinders, and means for supplying hydraulic fluid to said cylinders to move said bar horizontally to engage said arm and thereby turn said cutter box from a working position in which said cutter engages a work piece to a retracted posiiton in which said cutter does not engage the workpiece, said bar extending and remaining parallel to the direction of reciprocation of said slide.

References Cited by the Examiner
UNITED STATES PATENTS

| | | | |
|---|---|---|---|
| 1,266,839 | 5/18 | Maag | 90—18 |
| 2,364,065 | 12/44 | Frederichs | 90—55 X |
| 2,947,226 | 8/60 | Walter | 90—55 |

WILLIAM W. DYER, Jr., *Primary Examiner.*